United States Patent [19]

Boothman et al.

[11] Patent Number: 4,573,132
[45] Date of Patent: Feb. 25, 1986

[54] THERMAL MODEL FOR ELECTRICAL APPARATUS

[75] Inventors: David R. Boothman, Ennismore; John C. Forde, Peterborough, both of Canada

[73] Assignee: Canadian General Electric Co. Ltd., Toronto, Canada

[21] Appl. No.: 488,449

[22] Filed: Apr. 25, 1983

[30] Foreign Application Priority Data

May 7, 1982 [CA] Canada ................................. 402483

[51] Int. Cl.$^4$ .......................... G06F 15/20; H02H 7/08
[52] U.S. Cl. .................................... 364/557; 318/472; 361/24; 361/25; 364/480
[58] Field of Search ............... 364/557, 483, 492, 480; 361/24, 25, 26, 30, 31, 33, 93, 158; 318/473, 472

[56] References Cited

U.S. PATENT DOCUMENTS

| 3,860,861 | 1/1975 | Gucker | 361/25 |
| 4,044,288 | 8/1977 | Godfrey | 318/473 |
| 4,291,355 | 9/1981 | Dinger | 364/480 |
| 4,307,325 | 12/1981 | Saar | 318/472 |
| 4,319,298 | 3/1982 | Davis et al. | 361/24 |
| 4,413,213 | 11/1983 | Baumgarten, Jr. | 361/30 |
| 4,413,325 | 11/1983 | Elfner et al. | 364/557 |

FOREIGN PATENT DOCUMENTS

| 983094 | 2/1976 | Canada | 318/50 |
| 1032655 | 6/1978 | Canada | 359/9 |

Primary Examiner—Errol A. Krass
Assistant Examiner—Kevin J. Teska

[57] ABSTRACT

A thermal model of an electric apparatus such as a transformer or motor, from which signals can be obtained representing temperatures of the conductors and of the adjacent core material, includes storing first and second values, respectively, representing conductor temperature and core material temperature. The magnitude of the current(s) in the apparatus is sensed and a digital signal representative thereof is added to the first value to represent heat generated in the conductors. Values are determined for both heat transferred from the conductors and heat transferred into the apparatus core based on the difference in the first and second values. The value representing heat transferred from the conductor is subtracted from the first value to give a new first value and the value representing heat transferred to the core is added to the second value. Another value is determined from heat transferred from the core material, based on the difference between the new second value and a reference value, and this is subtracted from the new second value. This other value may be modified when the electric apparatus is a motor to provide for variations in heat loss between when the motor is rotating and when it is stationary or, when some other form of forced cooling is employed, whether the forced cooling is active or not. The first and second values thus, at all times, representing conductor temperature and core or average temperature and these temperatures can be used to interrupt the supply of power to the apparatus when predetermined levels are exceeded.

20 Claims, 1 Drawing Figure

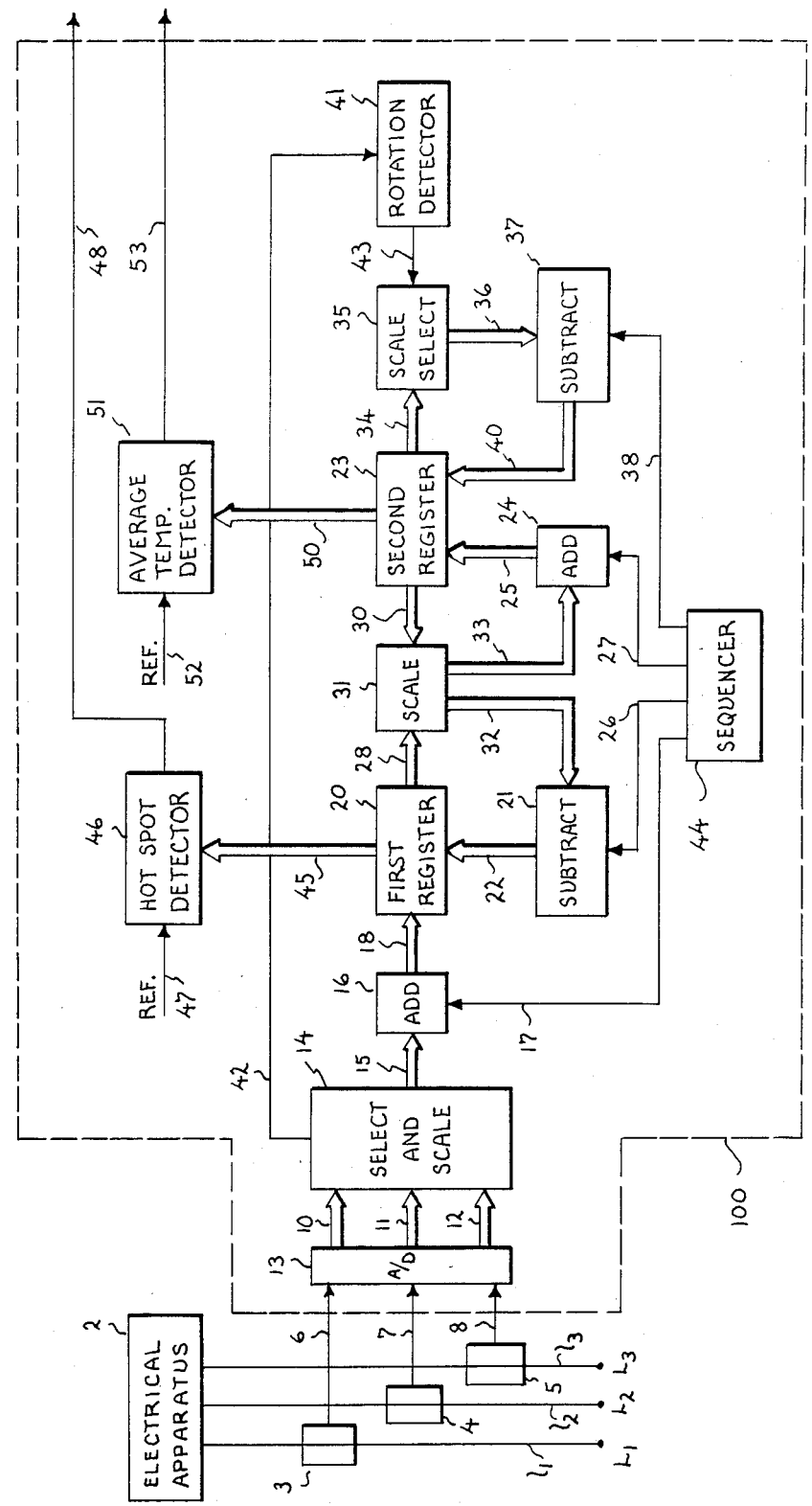

THERMAL MODEL FOR ELECTRICAL APPARATUS

BACKGROUND OF THE INVENTION

The present invention relates generally to the protection of electrical apparatus and more particularly to a thermal model for an electrical apparatus from which can be determined representations of temperatures in the apparatus useful in protecting the apparatus from overtemperatures.

As is well known, excessive temperatures can occur in an electrical apparatus as a result of a sudden large overload, as a result of a small continuous overload, or as a result of some fault or interruption in the cooling or ventilating system. In addition, in three phase apparatus excessive temperature can arise from a phase loss or a phase unbalance condition. U.S. patent application Ser. No. 487,771, now U.S. Pat. No. 4,544,982, "Electrical Equipment Protection Apparatus and Method" by D. R. Boothman et al., filed on even date herewith and assigned to the assignee of the present invention describes a protection apparatus and method which makes use of a composite digital poly-phase current signal to protect against phase loss, phase unbalance, phase sequence reversal, and overtemperature. It includes a thermal model which determines temperatures and causes interruption of the electrical supply when predetermined temperatures are exceeded. The present invention is for an improved thermal model which can be used in a variety of situations including the protection apparatus of the aforementioned patent application. The thermal model of this invention can also be used to determine temperatures in single phase apparatus and to provide overtemperature protection for other electrical apparatus.

An electrical apparatus, such as a transformer or electric motor, normally has conductors having a relatively small thermal capacity and a core material having a larger thermal capacity. It is intended herein that the term "core material" be a general term; that is, it may include not only the iron core components but also other materials involved in the heat transfer such as insulation and supporting structure. Heat is generated in the conductors in accordance with the level of current and the conductor resistance and much of this heat is transferred to the core material at a rate which depends on the temperature difference between the conductors and the mass of the core material and the respective thermal resistivities. In addition, heat is normally dissipated from the core material at a rate which depends on the temperature difference between the core material and ambient (or any other cooling medium) and the thermal resistivity. Thus, there are several values for thermal capacity and thermal resistivity as well as the actual temperatures to be considered in any such model.

When the thermal analog or model is for a motor or other electrical apparatus with forced cooling, the same general situation exists. There is one rate of cooling when the motor is rotating and another when it is not rotating. In other electrical apparatus with forced cooling, such as fan cooling, there is one rate of cooling when the fan is operating and another when it is not operating.

It will be seen that there are a number of variables and a number of rates of heat transfer involved in a thermal model. One known way of making a very simple thermal model involves the use of one or more bimetallic elements with heaters responsive to current. This type of bimetallic element provides a time constant; that is, the heater heats the bimetallic element at a rate proportional to current and when the bimetal reaches a predetermined temperature it opens contacts to remove the supply of power to the apparatus it is protecting. If the current is below an acceptable value, a balance is reached between the heat generated in the heater and the heat loss so that the bimetallic element does become hot enough to open the contacts.

A more sophisticated thermal model is described in Canadian Pat. No. 983,094—Boothman et al., issued Feb. 3, 1976 to Canadian General Electric Company Limited. This described thermal model has a resistor-capacitor analog circuit simulating the thermal properties of the conductors, a charging circuit for charging the resistor-capacitor circuit at a rate proportional to current in the motor it is modelling, and a resistance circuit connected with the resistor-capacitor analog circuit simulating the thermal resistance of conductor insulation for discharging the resistance-capacitor circuit in accordance with heat transferred from the conductors. The voltage of the charge in the resistance-capacitance circuit represents temperature and is used to indicate temperatures over a predetermined limit or to trip a breaker to interrupt power to the motor.

SUMMARY OF THE INVENTION

The thermal model of the present invention provides a more accurate model or simulation of temperature and heat transfer in an electrical apparatus. The thermal model is digital and has a first store (e.g., register) which represents the current carrying conductors in the apparatus and a second store (e.g., register) which represents the mass of core material. The count in the first register is increased according to the current in the conductors which generates heat in the conductors. This count represents conductor temperature. The count in the second register represents the temperature of the core material. A scale means receives the count from the first and second registers and the difference in the counts represents the difference in temperature between the conductors and the core material. The temperature difference, as well as respective thermal capacities and thermal resistivity govern the transfer of heat from the conductors to the core. The temperature difference is a variable and this is available to the scale means. The scale means reduces the count in the first register to represent heat transferred from the conductors and it increases the count in the second register to represent heat transferred into the core material. The rates are, of course, different. There is a second scale means which receives the count from the second register. This second scale means either assumes an ambient temperature and determines a temperature difference between the core material and ambient, or it receives a signal from a temperature sensor representing ambient temperature and determines a difference based on that. This second scale means reduces the count in the second register to represent heat lost to ambient. Thus, the counts in the first and second registers represent, with considerable accuracy, the temperature of the conductors (hot spot temperature) and the temperature of the core material (average temperature). Either or both can be used to interrupt the supply of power to the apparatus if the respective temperatures exceed a predetermined level(s).

If the apparatus being protected with the thermal model is a motor, or is otherwise force cooled as by a fan, a sensor provides a signal to the second scale means so that the scale can be altered according to whether or not there is rotation (or fan); that is, according to the cooling effect existing at that time.

Control apparatus is provided to control or sequence the various addition and subtraction operations.

It is, therefore, an object of the present invention to provide a thermal model, operating digitally, to give greater precision and stability in giving a representation of temperatures in an electrical apparatus.

It is another feature of the invention to provide an arrangement for detecting overtemperatures in an electrical apparatus using a thermal model of the apparatus.

It is yet another feature of the invention to provide a thermal model of an electrical motor where the model uses two or more temperature difference dependent digital representatives in determining equivalent temperatures.

Accordingly, there is provided a thermal model of an electrical apparatus which has current-carrying conductors and a core material which model provides first for storing, in respective registers (stores), digital values representing conductor temperature and core material temperature. A first digital signal representing current in the conductors is periodically added to the value in said first register. The values stored in said first and second registers are differenced to obtain a value representing temperature difference between the conductors and the core material and, in response thereto, second and third digital signals are determined which represent, respectively, heat transferred from the conductors and heat transferred to the core material. The second digital signal is periodically subtracted from the value in said first register, and the third digital signal is periodically added to the value in said second register, and means for receiving the value stored in said second register. The value stored in said second register is employed to determine a fourth digital signal representing heat transferred from said second register.

BRIEF DESCRIPTION OF THE DRAWING

While the present invention is defined by the claims appended to and forming a part of this specification, a better understanding thereof can be had by reference to the following description taken in conjunction with the accompanying drawing in which the single FIGURE illustrates the invention.

DETAILED DESCRIPTION

Referring to the drawing, a three phase power source represented by terminals $L_1$, $L_2$, and $L_3$ is connected by suitable conductors $1_1$, $1_2$ and $1_3$ to an electrical apparatus 2 of which it is desired to develop a thermal model in accordance with the present invention. Associated, respectively, with the three lines $1_1$, $1_2$ and $1_3$ are three current sensors 3, 4 and 5 (of any suitable type) which provide respective output signals on lines 6, 7 and 8 which are representative of the currents in each of the lines $1_1$, $1_2$ and $1_3$. The signals on lines 6, 7 and 8 are furnished to an analog-to-digital (A/D) converter 13 which delivers on buses 10, 11 and 12 digital representations of the respective signals on lines 6, 7 and 8.

The three buses 10, 11 and 12 are shown connected to a select and scale circuit 14. Three buses are used to show the thermal model as it would appear used as a model for an electrical apparatus powered from a three phase electrical supply. The thermal model will function as a model for an electrical apparatus powered from a single phase electrical supply and in such a case there would only be one bus connected to the select and scale circuit 14 and there would be no select function necessary. When three digital signals are provided to select and scale circuit 14, the largest signal is selected and then scaled appropriately and the resulting signal, on bus 15, is applied to add register 16. The add register 16 stores the digital value until it receives a sequencing signal on conductor 17. When it receives a sequencing signal from conductor 17, register 16 provides the stored digital value over bus 18 to a first store; e.g., register 20. The scaled digital values added to the first register 20 are proportional to current in the apparatus and represent heat generated by the current in the conductors of the electrical apparatus. The count in the first register 20 represents the temperature of the conductors.

A portion of the heat in the conductors of the apparatus will flow from the conductors and this heat is represented by the value subtracted from first register 20 by the subtract register 21 via bus 22. Some of the heat generated in the conductors of the apparatus will flow into the surrounding core material and this heat is represented by the value added to a store; e.g., second register 23, from add register 24 over bus 25. The subtract register 21 provides the subtract value to first register 20 when subtract register 21 receives a sequence signal on conductor 26. Similarly the add register 24 provides the add value to second register 23 when add register 24 receives a sequence signal on conductor 27.

The values from first register 20 and from second register 23 are available, respectively, over buses 28 and 30 at scale circuit 31. The values represent the temperature of the conductors and the temperature of the surrounding core. The transfer of heat from the conductors to the core depends upon the thermal resistance (a fixed value), upon the thermal capacities (a fixed value), and upon the temperature difference (a variable value). The scale circuit 31 receives the signals representing the two temperatures and determines a temperature difference. Based on the temperature difference and the fixed thermal values, the flow of heat out of the conductors and the flow of heat into the core can be determined. These determined values are available over bus 32 and bus 33 to subtract register 21 and add register 24, respectively.

The core material is cooled by air circulation or by some other cooling means. The rate of cooling is affected by the difference in temperature between the core and the cooling medium which in many cases is ambient air. Second register 23 contains a value representing the temperature of the core material and this is available over bus 34 to a scale select circuit 35. Scale circuit 35 may have a value set in for a reference cooling temperature representing an average ambient temperature, or it may have a temperature sensor which provides a signal representing ambient temperature (or the temperature of the cooling medium if it is different from ambient). Canadian Pat. No. 1,032,655—Boothman et al., issued June 6, 1978 to Canadian General Electric Company Limited, describes one form of ambient sensing and compensation for an analog type protection circuit. Thus scale circuit 35 can determine the difference in temperature between the core material and a reference and the difference will affect the rate of heat transfer out of the core material. The scale circuit 35 provides, over bus 36, a digital value representing the transfer of heat out of the core material and this is available at subtract register 37. When subtract register 37 receives a sequence signal over conductor 38, it provides the subtract value to second register 23 over bus 40.

When the electrical apparatus is an electric motor there will be two rates at which the core material cools. One rate will be effective when the motor is at rest and the other when the motor is rotating. It is important to know the cooling of the motor at rest, for example, when re-starting the motor. Therefore, there is provided a rotation detector 41. In a simple form the rotation detector 41 may receive a signal over conductor 42 from select and scale circuit 14 indicating that current is flowing to the motor and consequently that the motor is running. Alternately a tachometer could be used to provide a signal indicating rotation or absence of rotation. If rotation is detected by rotation detector 41, a signal is provided on conductor 43 to scale select circuit 35 to select the running scale. If there is no rotation scale, select circuit selects the standstill scale which normally would represent a lower rate of heat loss by the core.

It will, of course, be apparent that electrical apparatus other than an electric motor might have two cooling rates (or possibly more). For example, a transformer might be fan-cooled.

It will be recalled that sequencing signals were provided on conductors 17, 26, 27 and 38 to add register 16, subtract register 21, add register 24 and subtract register 37, respectively. These sequencing signals are provided periodically by sequencer 44 to control and organize the changes to registers 20 and 23.

It is believed that the overall operation of the thermal model, according to the invention, will be quite clear. A digital signal representing current to an apparatus is derived and is available in an add register 16. The heating caused by current flowing in the apparatus conductors is proportional to the current and hence to the scaled digital signal in add register 16. This digital signal is periodically added to first register 20 and the digital value or count in the register 20 represents conductor temperature. A digital value is periodically subtracted by subtract register 21, at a rate representing the rate of heat flow from the conductors, and a digital value is added to second register 23 by add register 24 at a rate representing the rate of heat flow into the core. A digital value is subtracted from second register 23 by subtract register 37 at a rate representing the rate of heat flow out of the core material. The rates of increase and decrease will, of course, depend on both the difference in temperature between the source and the sink and the relative masses involved. Thus, first register 20 contains a value representing the temperature of the conductors, which is normally the hottest temperature when the apparatus is operating, and the second register 23 contains a value representing the temperature of the core material which may be called the average temperature.

The digital value or count in first register 20 is available on bus 45 to a hot spot detector circuit 46. The detector circuit 46 compares the digital signal on bus 45 with a reference value present into the circuit at input 47. The reference value represents the maximum permissible conductor temperature. When the digital signal on bus 45 exceeds the reference, a trip signal is provided on conductor 48. Similarly the digital value or count in the second register 23 is available on bus 50 to an average temperature detector circuit 51. The detector circuit 51 compares the digital value on bus 50 with a reference value preset into the circuit at input 52. The reference value at input 52 represents the maximum permissible temperature of the core material, i.e., the maximum average temperature. When the signal on bus 50 exceeds the reference, a trip signal is provided on conductor 53.

The trip signals on conductors 48 and 53 can be used to trip a breaker (not shown) and thus interrupt the supply of electrical power to the apparatus when the temperature of the conductors or the core exceeds a predetermined level.

While the present invention has been thus far described in an ambodiment employing discrete functional components, and while it is believed that this invention may be best understood with such explanation, it is to be expressly understood that with present day technology, a more practical implementation of the invention (at least from a cost standpoint) would employ a suitable programmed data processor. An example of such a data processor available today on the commercial market is that sold by Intel Corporation under its 8022 designation; i.e., the Intel 8022 microprocessor. In the FIGURE, the functions which can be performed by such an appropriately programmed processor are indicated within the dashed line block 100 and it is seen that essentially all functions, except current sensing, may be so performed.

One suitable program for use on an Intel 8022 to achieve the present invention is defined in the attached appendix "Thermal Model" which is attached to and forms a part of this specification.

While there been shown and described what are at present considered to be the preferred embodiments of the present invention, modifications thereto will readily occur to those skilled in the art. It is not desired, therefore, that the invention be limited to the specific arrangements shown and described, but it is intended to cover in the appended claims all such modifications as fall within the true spirit and scope of the invention.

APPENDIX

THERMAL MODEL

```
ISIS-II MCS-48/UPI-41 MACRO ASSEMBLER, V3.0

LOC  OBJ        LINE   SOURCE STATEMENT

1315  $INCLUDE (:F1:OVRUPD.SRC)
           =1316  ;*************************************************
           =1317  ;
           =1318  ;***    UPDATE OVERLOAD MODEL    ***
           =1319  ;
           =1320  ;*************************************************
           =1321  ;
0477 74ED  =1322  OVRUPD: CALL   SQHIPH         ;SQUARE HIGHEST
           =1323  ;                              PHASE CURRENT
0479 B821  =1324          MOV    R0,#IPROFL
047B F0    =1325          MOV    A,@R0
047C 5340  =1326          ANL    A,#BIT6
047E 9689  =1327          JNZ    OVRU05
           =1328  ;
0480 B818  =1329          MOV    R0,#OVRTMR
0482 F0    =1330          MOV    A,@R0          ;IF OVERLOAD-UPDATE-
```

| LOC | OBJ | LINE | | SOURCE STATEMENT | | |
|---|---|---|---|---|---|---|
| | | | | | | |
| Ø483 | 96A2 | =1331 | | JNZ | OVRU15 | ; TIMER = Ø |
| Ø485 | 94A3 | =1332 | | CALL | LOFACS | ; SEUP LOW-RANGE IRFAC |
| Ø487 | 848B | =1333 | | JMP | OVRU1Ø | |
| | | =1334 | ; | | | |
| Ø489 | 94B2 | =1335 | OVRUØ5: | CALL | HIFACS | ;SETUP HIGH-RANGE IRFAC |
| | | =1336 | ; | | | |
| Ø48B | B83Ø | =1337 | OVRU1Ø: | MOV | RØ,#IRFAC | ;SAVE IRFAC |
| Ø48D | FB | =1338 | | MOV | A,R3 | |
| Ø48E | AØ | =1339 | | MOV | @RØ,A | |
| Ø48F | 18 | =134Ø | | INC | RØ | |
| Ø49Ø | FC | =1341 | | MOV | A,R4 | |
| Ø491 | AØ | =1342 | | MOV | @RØ,A | |
| | | =1343 | ; | | | |
| Ø492 | 94 BE | =1344 | | CALL | CTDIFF | ;CALC. OLD TEMPS DIFF. |
| | | =1345 | ; | | | |
| Ø494 | B4ØØ | =1346 | | CALL | CT1NEW | ;CALC. NEW COPPER TEMP. |
| | | =1347 | ; | | | |
| Ø496 | B42F | =1348 | | CALL | CT2NEW | ;CALC. NEW STEEL TEMP. |
| | | =1349 | ; | | | |
| Ø498 | D4ØØ | =135Ø | | CALL | OVRCHK | ;CHECK FOR OVERLOAD & STALL TRIP LEVELS |
| | | =1351 | ; | | | |
| Ø49A | B818 | =1352 | | MOV | RØ,#OVRTMR | |
| Ø49C | FØ | =1353 | | MOV | A,@RØ | ;IF OVRTMR TIMED OUT, |
| Ø49D | 96A2 | =1354 | | JNZ | OVRU15 | |

| LOC | OBJ | LINE | SOURCE STATEMENT | | |
|---|---|---|---|---|---|
| 049F | 2304 | =1355 | MOV | A,#OVRCNT | ; RE-INZ TIMER |
| 04A1 | A0 | =1356 | MOV | @R0,A | |
| | | =1357 | ; | | |
| 04A2 | 83 | =1358 | OVRU15: RET | | |
| | | =1359 | ; | | |
| | | 1360 | $EJECT | | |
| | | 1361 | $INCLUDE (:F1:LOFACS.SRC) | | |
| | | =1362 | ;************************************************* | | |
| | | =1363 | ; | | |
| | | =1364 | ;  ***   SETUP LOW RANGE IRFAC   *** | | |
| | | =1365 | ; | | |
| | | =1366 | ;************************************************* | | |
| | | =1367 | ; | | |
| 04A3 | BD02 | =1368 | LOFACS: MOV | R5,#LORNGM | |
| | | =1369 | ; | | |
| 04A5 | 27 | =1370 | LOFA05: CLR | A | |
| 04A6 | 74CA | =1371 | CALL | DBLRSH | |
| 04A8 | EDA5 | =1372 | DJNZ | R5,LOFA05 | |
| | | =1373 | ; | | |
| 04AA | BD07 | =1374 | MOV | R5,#C1 | |
| | | =1375 | ; | | |
| 04AC | 27 | =1376 | LOFA10: CLR | A | |
| 04AD | 74CA | =1377 | CALL | DBLRSH | |
| 04AF | EDAC | =1378 | DJNZ | R5,LOFA10 | |
| | | =1379 | ; | | |

| LOC | OBJ | LINE | SOURCE STATEMENT |
|---|---|---|---|
| 04B1 | 83 | =1380 | RET |
| | | =1381 | ; |
| | | 1382 | $EJECT |
| | | 1383 | $INCLUDE (:F1:HIFACS.SRC) |
| | | =1384 | ;************************************************ |
| | | =1385 | ; |
| | | =1386 | ;  ***  SETUP HIGH RANGE IRFAC  *** |
| | | =1387 | ; |
| | | =1388 | ;************************************************ |
| | | =1389 | ; |
| 04B2 | BD07 | =1390 | HIFACS: MOV   R5,#STALTM |
| | | =1391 | ; |
| 04B4 | D45E | =1392 | CALL  DIVIDE |
| | | =1393 | ; |
| 04B6 | BD02 | =1394 | MOV   R5,#BASTMS |
| | | =1395 | ; |
| 04B8 | 27 | =1396 | HIFA05: CLR   A |
| 04B9 | 74CA | =1397 | CALL  DBLRSH |
| 04BB | EDB8 | =1398 | DJNZ  R5,HIFA05 |
| | | =1399 | ; |
| 04BD | 83 | =1400 | RET |
| | | =1401 | ; |
| | | =1402 | $EJECT |
| | | 1403 | $INCLUDE (:F1:CTDIFF.SRC) |

| LINE | LOC | OBJ | | SOURCE STATEMENT | | |
|---|---|---|---|---|---|---|
| =1404 | | | ;************************************************ | | | |
| =1405 | | | ; | | | |
| =1406 | | | ; *** | CALCULATE OLD TEMPS DIFFERENCE | *** | |
| =1407 | | | ; | | | |
| =1408 | | | ;************************************************ | | | |
| =1409 | | | ; | | | |
| =1410 | 04BE | B838 | CTDIFF: | MOV | R0,#T1 | |
| =1411 | 04C0 | F0 | | MOV | A,@R0 | |
| =1412 | 04C1 | AD | | MOV | R5,A | |
| =1413 | 04C2 | 18 | | INC | R0 | |
| =1414 | 04C3 | F0 | | MOV | A,@R0 | |
| =1415 | 04C4 | AE | | MOV | R6,A | |
| =1416 | | | ; | | | |
| =1417 | 04C5 | 18 | | INC | R0 | |
| =1418 | 04C6 | F0 | | MOV | A,@R0 | |
| =1419 | 04C7 | AB | | MOV | R3,A | |
| =1420 | 04C8 | 18 | | INC | R0 | |
| =1421 | 04C9 | F0 | | MOV | A,@R0 | |
| =1422 | 04CA | AC | | MOV | R4,A | |
| =1423 | | | ; | | | |
| =1424 | 04CB | 74B2 | | CALL | DBLSUB | |
| =1425 | | | ; | | | |
| =1426 | 04CD | B832 | | MOV | R0,#T1LST2 | |
| =1427 | 04CF | FB | | MOV | A,R3 | |
| =1428 | 04D0 | A0 | | MOV | @R0,A | |

| LOC | OBJ | | SOURCE STATEMENT | | |
|---|---|---|---|---|---|
| | | =1429 | | INC | RØ |
| Ø4D1 | 18 | =143Ø | | MOV | A,R4 |
| Ø4D2 | FC | =1431 | | MOV | @RØ,A |
| Ø4D3 | AØ | =1432 | ; | | |
| Ø4D4 | 83 | =1433 | | RET | |
| | | =1434 | ; | | |
| | | =1435 | $EJECT | | |
| | | =1436 | $INCLUDE (:F1:CT1FAC.SRC) | | |
| | | =1437 | ;*********************************************** | | |
| | | =1438 | ; | | |
| | | =1439 | ;***     CALC.   T1   DIFFERENCE   FACTOR   *** | | |
| | | =144Ø | ; | | |
| | | =1441 | ;*********************************************** | | |
| | | =1442 | ; | | |
| Ø4D5 | B821 | =1443 | CT1FAC: | MOV | RØ,#IPROFL |
| Ø4D7 | FØ | =1444 | | MOV | A,@RØ |
| Ø4D8 | 534Ø | =1445 | | ANL | A,#BIT6 |
| Ø4DA | C6E1 | =1446 | | JZ | CT1FØ5           ;HIGH RANGE ? |
| Ø4DC | 27 | =1447 | | CLR | A                ;NO |
| Ø4DD | AB | =1448 | | MOV | R3,A             ;YES, FACTOR = Ø |
| Ø4DE | AC | =1449 | | MOV | R4,A |
| Ø4DF | 84EF | =145Ø | | JMP | CT1F15 |
| | | =1451 | ; | | |
| Ø4E1 | B832 | =1452 | CT1FØ5: | MOV | RØ,#T1LST2 |

| LOC  | OBJ  | LINE   |        | SOURCE STATEMENT |
|------|------|--------|--------|------------------|
| 04E3 | F0   | =1453  |        | MOV   A,@R0      |
| 04E4 | AB   | =1454  |        | MOV   R3,A       |
| 04E5 | 18   | =1455  |        | INC   R0         |
| 04E6 | F0   | =1456  |        | MOV   A,@R0      |
| 04E7 | AC   | =1457  |        | MOV   R4,A       |
|      |      | =1458  |        | ;                |
| 04E8 | BD08 | =1459  |        | MOV   R5,#R1C1   |
|      |      | =1460  |        | ;                |
| 04EA | 27   | =1461  | CT1F10:| CLR   A          |
| 04EB | 74CA | =1462  |        | CALL  DBLRSH     |
| 04ED | EDEA | =1463  |        | DJNZ  R5,CT1F10  |
|      |      | =1464  |        | ;                |
| 04EF | 83   | =1465  | CT1F15:| RET              |
|      |      | =1466  |        | ;                |
|      |      | 1467   |        | $EJECT           |
|      |      | 1468   |        | $INCLUDE (:F1:CT1DEL.SRC) |
|      |      | =1469  |        | ;***************************************** |
|      |      | =1470  |        | ;                |
|      |      | =1471  |        | ;***   CALC. DELTA T1  *** |
|      |      | =1472  |        | ;                |
|      |      | =1473  |        | ;***************************************** |
|      |      | =1474  |        | ;                |
| 04F0 | B930 | =1475  | CT1DEL:| MOV   R1,#IRFAC  |
| 04F2 | F1   | =1476  |        | MOV   A,@R1      |

| LOC | OBJ | | SOURCE STATEMENT | | |
|---|---|---|---|---|---|
| | | =1477 | MOV | R5,A | |
| 04F3 | AD | =1478 | INC | R1 | |
| 04F4 | 19 | =1479 | MOV | A,@R1 | |
| 04F5 | F1 | =1480 | MOV | R6,A | |
| 04F6 | AE | =1481 | ; | | |
| 04F7 | 74B2 | =1482 | CALL | DBLSUB | |
| | | =1483 | ; | | |
| 04F9 | 83 | =1484 | RET | | |
| | | =1485 | ; | | |
| | | =1486 | $EJECT | | |
| | | 1487 | ; | | |
| 0500 | | 1488 | ORG | 500H | |
| | | 1489 | ; | | |
| | | 1490 | $INCLUDE (:F1:CT1NEW.SRC) | | |
| | | =1491 | ;************************************************ | | |
| | | =1492 | ; | | |
| | | =1493 | ;*** CALC. NEW COPPER TEMP. (T1) *** | | |
| | | =1494 | ; | | |
| | | =1495 | ;************************************************ | | |
| | | =1496 | ; | | |
| 0500 | 94D5 | =1497 | CT1NEW: CALL | CT1FAC | ;CALC. T1 DIFF. FACTOR |
| | | =1498 | ; | | |
| 0502 | 94F0 | =1499 | CALL | CT1DEL | ;CALC. DELTA T1 |
| | | =1500 | ; | | |

| LOC | OBJ | LINE | | SOURCE | STATEMENT | |
|---|---|---|---|---|---|---|
| 0504 | 27 | =1501 | | CLR | A | |
| 0505 | AA | =1502 | | MOV | R2,A | |
| 0506 | FB | =1503 | | MOV | A,R3 | |
| 0507 | 5380 | =1504 | | ANL | A,#BIT7 | |
| 0509 | C60C | =1505 | | JZ | CT1N05 | |
| 050B | 1A | =1506 | | INC | R2 | |
| | | =1507 | ; | | | |
| 050C | B938 | =1508 | CT1N05: | MOV | R1,#T1 | |
| 050E | F1 | =1509 | | MOV | A,@R1 | |
| 050F | AD | =1510 | | MOV | R5,A | |
| 0510 | 19 | =1511 | | INC | R1 | |
| 0511 | F1 | =1512 | | MOV | A,@R1 | |
| 0512 | AE | =1513 | | MOV | R6,A | |
| 0513 | 74C3 | =1514 | | CALL | DBLADD | ;T1 = T1 + DELTA1 |
| | | =1515 | ; | | | |
| 0515 | FB | =1516 | | MOV | A,R3 | |
| 0516 | C61F | =1517 | | JZ | CT1N10 | |
| 0518 | 5380 | =1518 | | ANL | A,#BIT7 | |
| 051A | C628 | =1519 | | JZ | CT1N20 | |
| 051C | FA | =1520 | | MOV | A,R2 | |
| 051D | C624 | =1521 | | JZ | CT1N15 | |
| | | =1522 | ; | | | |
| 051F | 27 | =1523 | CT1N10: | CLR | A | ;YES, T1 = 0 |
| 0520 | AB | =1524 | | MOV | R3,A | |

| LOC | OBJ | | SOURCE STATEMENT | |
|---|---|---|---|---|
| | | =1525 | MOV | R4,A |
| 0521 AC | | =1526 | JMP | CT1N20 |
| 0522 A428 | | =1527 | ; | |
| | | =1528 CT1N15: | MOV | A,#7FH |
| 0524 237F | | =1529 | MOV | R3,A |
| 0526 AB | | =1530 | MOV | R4,A |
| 0527 AC | | =1531 | ; | |
| | | =1532 CT1N20: | MOV | A,R4 ;SAVE NEW T1 |
| 0528 FA | | =1533 | MOV | @R1,A |
| 0529 A1 | | =1534 | DJNZ | R1,CT1N25 |
| 052A E92C | | =1535 CT1N25: | MOV | A,R3 |
| 052C FB | | =1536 | MOV | @R1,A |
| 052D A1 | | =1537 | ; | |
| | | =1538 | RET | |
| 052E 83 | | =1539 | ; | |
| | | =1540 | $EJECT | |
| | | =1541 | $INCLUDE (:F1:CT2NEW.SRC) | |
| | | =1542 | ;************************************************ | |
| | | =1543 | ; | |
| | | =1544 | ;*** CALC. NEW STEEL TEMP. (T2) *** | |
| | | =1545 | ; | |
| | | =1546 | ;************************************************ | |
| | | =1547 | ; | |
| 052F B44D | | =1548 CT2NEW: | CALL | CT2FAC |

| LOC | OBJ | LINE | | SOURCE | STATEMENT | |
|---|---|---|---|---|---|---|
| | | =1549 | ; | CALL | CSTAIR | |
| 0531 | B46C | =1550 | | | | |
| | | =1551 | ; | | | |
| 0533 | B4A0 | =1552 | | CALL | CT2DEL | |
| | | =1553 | ; | | | |
| 0535 | B93A | =1554 | | MOV | R1,#T2 | |
| 0537 | F1 | =1555 | | MOV | A,@R1 | |
| 0538 | AD | =1556 | | MOV | R5,A | |
| 0539 | 19 | =1557 | | INC | R1 | |
| 053A | F1 | =1558 | | MOV | A,@R1 | |
| 053B | AE | =1559 | | MOV | R6,A | |
| | | =1560 | ; | | | |
| 053C | 74C3 | =1561 | | CALL | DBLADD | |
| | | =1562 | ; | | | |
| 053E | FB | =1563 | | MOV | A,R3 | |
| 053F | 5380 | =1564 | | ANL | A,#BIT7 | ;T2 < 0 ? |
| 0541 | C646 | =1565 | | JZ | CT2N05 | ;NO |
| | | =1566 | ; | | | |
| 0543 | 27 | =1567 | | CLR | A | |
| 0544 | AB | =1568 | | MOV | R3,A | ;YES, T2 = 0 |
| 0545 | AC | =1569 | | MOV | R4,A | |
| | | =1570 | ; | | | |
| 0546 | FC | =1571 | CT2N05: | MOV | A,R4 | |
| 0547 | A1 | =1572 | | MOV | @R1,A | |

| LOC | OBJ | | SOURCE STATEMENT | | |
|---|---|---|---|---|---|
| 0548 | E94A | =1573 | | DJNZ | R1,CT2N10 |
| 054A | FB | =1574 | CT2N10: | MOV | A,R3 |
| 054B | A1 | =1575 | | MOV | @R1,A |
| | | =1576 | ; | | |
| 054C | 83 | =1577 | | RET | |
| | | =1578 | ; | | |
| | | =1579 | $EJECT | | |
| | | =1580 | $INCLUDE (:F1:CT2FAC.SRC) | | |
| | | =1581 | ;************************************** | | |
| | | =1582 | ; | | |
| | | =1583 | ;***   CALC. T2 DIFFERENCE FACTOR   *** | | |
| | | =1584 | ; | | |
| | | =1585 | ;************************************** | | |
| | | =1586 | ; | | |
| 054D | B832 | =1587 | CT2FAC: | MOV | R0,#T1LST2 |
| 054F | F0 | =1588 | | MOV | A,@R0 |
| 0550 | AB | =1589 | | MOV | R3,A |
| 0551 | 18 | =1590 | | INC | R0 |
| 0552 | F0 | =1591 | | MOV | A,@R0 |
| 0553 | AC | =1592 | | MOV | R4,A |
| | | =1593 | ; | | |
| 0554 | BD0A | =1594 | | MOV | R5,#R1C2 |
| 0556 | B821 | =1595 | | MOV | R0,#IPROFL |
| 0558 | F0 | =1596 | | MOV | A,@R0 |

| LOC | OBJ | | SOURCE STATEMENT | |
|---|---|---|---|---|
| 0559 | 5340 | =1597 | ANL | A,#BIT6 ;HIGH RANGE ? |
| 055B | C65F | =1598 | JZ | CT2F05 ;NO,CONTINUE |
| 055D | BD0C | =1599 | MOV | R5,#R1C2 + BASTMS ;YES |
| | | =1600 | ; | |
| 055F | 27 | =1601 CT2F05: | CLR | A |
| 0560 | 74CA | =1602 | CALL | DBLRSH |
| 0562 | ED5F | =1603 | DJNZ | R5,CT2F05 |
| | | =1604 | ; | |
| 0564 | B930 | =1605 | MOV | R1,#T2DFAC |
| 0566 | FB | =1606 | MOV | A,R3 |
| 0567 | A1 | =1607 | MOV | @R1,A |
| 0568 | 19 | =1608 | INC | R1 |
| 0569 | FC | =1609 | MOV | A,R4 |
| 056A | A1 | =1610 | MOV | @R1,A |
| | | =1611 | ; | |
| 056B | 83 | =1612 | RET | |
| | | =1613 | ; | |
| | | =1614 | $EJECT | |
| | | 1615 | $INCLUDE (:F1:CSTAIR.SRC) | |
| | | =1616 | ;************************************************************ | |
| | | =1617 | ; | |
| | | =1618 | ;***   CALC.   STEEL-TO-AIR   FACTOR   *** | |
| | | =1619 | ; | |
| | | =1620 | ;************************************************************ | |

| LOC | OBJ | LINE | | SOURCE STATEMENT | | |
|---|---|---|---|---|---|---|
| | | =1621 | ; | | | |
| 056C | B93A | =1622 | CSTAIR: | MOV | R1,#T2 | |
| 056E | F1 | =1623 | | MOV | A,@R1 | |
| 056F | AB | =1624 | | MOV | R3,A | |
| 0570 | 19 | =1625 | | INC | R1 | |
| 0571 | F1 | =1626 | | MOV | A,@R1 | |
| 0572 | AC | =1627 | | MOV | R4,A | |
| | | =1628 | ; | | | |
| 0573 | BD0B | =1629 | | MOV | R5,#R2C2 | |
| 0575 | B821 | =1630 | | MOV | R0,#IPROFL | |
| 0577 | F0 | =1631 | | MOV | A,@R0 | |
| 0578 | 5340 | =1632 | | ANL | A,#BIT6 | ;HIGH RANGE ? |
| 057A | C67E | =1633 | | JZ | CSTA05 | ;NO |
| 057C | BD0D | =1634 | | MOV | R5,#R2C2 + BASTMS | |
| | | =1635 | ; | | | |
| 057E | 27 | =1636 | CSTA05: | CLR | A | |
| 057F | 74CA | =1637 | | CALL | DBLRSH | |
| 0581 | ED7E | =1638 | | DJNZ | R5,CSTA05 | |
| | | =1639 | ; | | | |
| 0583 | F0 | =1640 | | MOV | A,@R0 | |
| 0584 | 5340 | =1641 | | ANL | A,#BIT6 | |
| 0586 | 9697 | =1642 | | JNZ | CSTA15 | |
| | | =1643 | ; | | | |
| 0588 | B829 | =1644 | | MOV | R0#HIPCUR | |

| LOC | OBJ | | SOURCE | STATEMENT | |
|---|---|---|---|---|---|
| 058A | F0 | =1645 | | MOV | A,@R0 |
| 058B | 37 | =1646 | | CPL | A |
| 058C | 0319 | =1647 | | ADD | A,#ZERTHR |
| 058E | F697 | =1648 | | JC | CSTA15 |
| | | =1649 | ; | | |
| 0590 | BD02 | =1650 | | MOV | R5,#2 ;DIVIDE BY 4 |
| | | =1651 | ; | | |
| 0592 | 27 | =1652 | CSTA10: | CLR | A |
| 0593 | 74CA | =1653 | | CALL | DBLRSH |
| 0595 | ED92 | =1654 | | DJNZ | R5,CSTA10 |
| | | =1655 | ; | | |
| 0597 | FB | =1656 | CSTA15: | MOV | A,R3 |
| 0598 | 969F | =1657 | | JNZ | CSTA20 |
| 059A | FC | =1658 | | MOV | A,R4 |
| 059B | 969F | =1659 | | JNZ | CSTA20 |
| | | =1660 | ; | | |
| 059D | BC02 | =1661 | | MOV | R4,#STAIRC |
| | | =1662; | | | |
| 059F | 83 | =1663 | CSTA20: | RET | |
| | | =1664 | ; | | |
| | | 1665 | $EJECT | | |
| | | 1666 | $INCLUDE (:F1:CT2DEL.SRC) | | |
| | | =1667 | ;****************************************** | | |
| | | =1668 | ; | | |

```
LOC   OBJ         LINE       SOURCE STATEMENT

=1669   ;
                  =1670   ;
                  =1671   ;*********************************************************
                  =1672   ;
                  =1673   ;***  CALC. DELTA T2  ***
                  =1671   ;*********************************************************
                  =1672   ;
05A0  B930        =1673   CT2DEL: MOV    R1,#T2DFAC
05A2  F1          =1674           MOV    A,@R1
05A3  AD          =1675           MOV    R5,A
05A4  19          =1676           INC    R1
05A5  F1          =1677           MOV    A,@R1
05A6  AE          =1678           MOV    R6,A
                  =1679   ;
05A7  74B2        =1680           CALL   DBLSUB
                  =1681   ;
05A9  83          =1682           RET
                  =1683
                  =1684   $EJECT
```

We claim:

1. Apparatus for providing a thermal model of an electric apparatus which has current-carrying conductors and a core material comprising:
   (a) first and second registers for storing respectively digital values representing conductor temperature and core material temperature;
   (b) means for deriving, with respect to said conductors, a first digital signal representing current in said conductors and periodically adding said first digital signal to the value in said first register;
   (c) means for receiving the values stored in said first and second registers to obtain a difference representing the temperature difference between the conductors and the core material and, in response thereto, determining second and third digital signals representing heat transferred from the conductors;
   (d) means for periodically subtracting said /second digital signal from the value in said first register;
   (e) means for periodically adding said third digital signal to the value in said second register; and,
   (f) means for receiving the value stored in said second register and determining a fourth digital signal representing heat transferred from said second register.

2. Apparatus as defined in claim 1 in which said means for receiving the value stored in said second register includes means for comparing the value with a reference value representing temperature of an ambient medium and obtaining a difference representing a temperature difference between said core material and said ambient medium for determining said fourth digital signal.

3. A thermal model of an electric apparatus, said electric apparatus having current carrying conductors and a core material comprising:
   (a) means for deriving, with respect to said conductors, a first digital signal representing current in said conductors;
   (b) a first register for periodically receiving said first digital signal and adding it to the value therein;
   (c) a second register;
   (d) means for receiving second and third digital signals from said first and second registers respectively representing the values therein, deriving a difference value, and providing a fourth digital signal related to the difference value and representing heat transferred from the conductors and a fifth digital signal related to the difference and representing heat transferred from the conductors into said core material;
   (e) means for periodically subtracting the value represented by said fourth digital signal from the value in said first register;
   (f) means for periodically adding the value represented by said fifth signal to the value in said second register; and
   (g) means for periodically subtracting from said second register a value representing heat lost by the core material; whereby the value in said first register represents conductor temperature and the value in said second register represents core material temperature.

4. Apparatus as defined in claim 3 in which said means for deriving said first digital signal comprises a current sensor means and an analog-to-digital converter.

5. Apparatus for protecting an AC electric motor by interrupting the supply of electrical power to said motor in response to a determination from a thermal model of said motor of unacceptable thermal conditions comprising:
   (a) means to derive a digital signal represeting current supplied to said motor;
   (b) first and second registers for storing, respectively, digital values;
   (c) first adding means connected between said means to derive a digital signal and said first register;
   (d) a first scale means connected between said first and second registers for receiving the digital values from each register;
   (e) a first subtracting means connected between said first scale means and said first register;
   (f) a second adding means connected between said first scale means and said second register;
   (g) a second scale means connected to said second register for receiving the digital value therefrom;
   (h) a second subtracting means connected between said second scale means and said second register;
   (i) said first adding means receiving said digital signal and responsive thereto adding a digital value to said first register representing heating resulting from current flow in the current carrying conductors of said motor;
   (j) said first scale means receiving a digital value from said first register representing temperature of said conductors and a digital value from said second register representing temperature of the core material of said motor and responsive thereto providing a scaled digital signal to said first subtracting means representing heat transferred from said current carrying conductors and a scaled digital signal to said second adding means representing heat transferred to said core material;
   (k) said second scale means receiving a digital value from said second register representing temperature of said core material and providing a scaled digital signal to said second subtracting means representing heat transferred from said core material due to ventilation; and
   (l) a detector means for receiving the digital value in said first register representing conductor temperature and comparing it with a predetermined value representing a critical value, and for providing a trip signal for interrupting said supply when said digital value in said first register exceeds said first predetermined value.

6. Apparatus for protecting an AC electric motor as defined in claim 5 and further comprising:
   (a) a sequencer means connected to said first and second adding means and to said first and second subtracting means for periodically actuating said first and second adding means for adding the respective values therein to said first and second registers respectively and periodically actuating said first and second subtracting means for subtracting the respective values therein from said first and second registers respectively.

7. Apparatus as defined in claim 5 in which said means to derive a digital signal representing current supplied to said motor comprises a current sensor for deriving an analog value of the current supplied to said motor, and an analog-to-digital converter for converting the peak values of the current into said digital signal.

8. Apparatus as defined in claim 5 and further comprising a rotation detector means for detecting if the rotor of the motor is rotating or is stationary and for providing a rotation signal representative thereof, said second scale means determining in response to said rotation signal said second scaled signal representing one value of heat transferred from said core material when said rotor is rotating and another value when said rotor is stationary.

9. Apparatus for protecting an AC electric motor by interrupting the supply of electrical power to said motor in response to a determination from a thermal model of said motor of unacceptable thermal conditions comprising:
(a) means to derive a digital signal representing current supplied to said motor;
(b) a first register and a second register;
(c) first adding means connected between said means to derive a digital signal and said first register;
(d) a first scale means connected between said first and second registers for receiving the digital values from each register;
(e) a first subtracting means connected between said first scale means and said first register;
(f) a second adding means connected between said first scale means and said second register;
(g) a second scale means connected to said second register for receiving the digital value therefrom;
(h) a second subtracting means connected between said second scale means and said second register;
(i) said first adding means receiving said digital signal and responsive thereto adding a digital value to said first register representing heating resulting from current flow in the current carrying conductors of said motor;
(j) said first scale means receiving a digital value from said first register representing temperature of said conductors and a digital value from said second register representing temperature of the core material of said motor and responsive thereto providing a scaled digital signal to said first subtracting means representing heat transferred from said current carrying conductors and a scaled digital signal to said second adding means representing heat transferred to said core material;
(k) said second scale means receiving a digital value from said second register representing temperature of said core material and providing a scaled digital signal to said second subtracting means representing heat transferred from said core material to ambient; and
(l) a detector means for receiving the digital value in said second register representing average temperature in said core material and comparing it with a predetermined value representing a critical value, and for providing a trip signal suitable for interrupting said supply to said motor when said digital value in said second register exceeds said predetermined value.

10. Apparatus for protecting an AC electric motor as defined in claim 9 and further comprising:
(a) a sequencer means connected to said first and second adding means and to said first and second subtracting means for periodically actuating said first and second adding means for adding the respective values therein to said first and second registers respectively and periodically actuating said first and second subtracting means for subtracting the respective values therein from said first second registers respectively.

11. Apparatus as defined in claim 9 in which said means to derive a digital signal representing current supplied to said motor comprises a current sensor for deriving an analog value of the current supplied to said motor, and an analog-to-digital converter for converting the peak values of the current into said digital signal.

12. Apparatus as defined in claim 9 and further comprising a rotation detector means for detecting if the rotor of the motor is rotating or is stationary and for providing a rotation signal representative thereof, said second scale means determining in response to said rotation signal said second scaled signal representing one value of heat transferred from said core material when said rotor is rotating and another value when said rotor is stationary.

13. A method for providing a thermal model of an electric apparatus which has current-carrying conductors and a core material comprising the steps:
(a) storing, respectively in first and second stores, digital values representing conductor temperature and core material temperature;
(b) deriving a first digital signal representing current in said conductors and periodically adding said first digital signal to the value in the first store;
(c) deriving a difference value between the values in the first and second stores representing the temperature difference between the conductors and the core material;
(d) determining, in response to said difference value, second and third digital signals representing heat transferred from the conductors;
(e) periodically subtracting said second digital signal from the value in the first store;
(f) periodically adding said third digital signal to the value in said second store; and,
(g) determining a fourth digital signal representing heat transferred from core material as a function of the extant digital value in the second store.

14. The method defined in claim 13 in which the step of determining said fourth digital signal includes comparing the extant digital value in the second store with a reference value representing the temperature of an ambient medium to obtain a difference therebetween.

15. The method in accordance with claim 13 further including the step of comparing the value in the second store to a predetermined value representing a critical value and for providing in response to a predetermined relationship therebetween, a signal capable of initiating protective action with respect to the electrical apparatus.

16. A method of providing a thermal model of an electric apparatus having current carrying conductors and a core material comprising the steps:
(a) deriving, with respect to the conductors, a first digital signal representing the current in the conductors;
(b) periodically adding said first digital signal to an extant value in a first store representing conductor temperature;
(c) retaining an extant value representing core material temperature in a second store;
(d) deriving a difference value between the values in said first and second stores;
(e) developing, from said difference value a second digital signal representing heat transferred from the conductors and a third digital signal representing heat transferred from the conductors into said core material;

(f) periodically subtracting the value represented by said second digital signal from the extant value in the first store;

(g) periodically adding the value represented by said third digital signal to the extant value in the second store; and (h) periodically subtracting from the extant value in the second store a value representing heat lost by the core material whereby the value in the first store represents conductor temperature and the value in the second store represents core material temperature.

17. The invention in accordance with claim 16 further including the steps:
   (a) detecting whether the motor is rotating or stationary; and,
   (b) adjusting the scaling of the value representing the heat lost by the core material as a function of said detecting.

18. The method in accordance with claim 16 further including the step of comparing the value in the second store to a predetermined value representing a critical value and for providing, in response to a predetermined relationship therebetween, a signal capable of initiating protective action with respect to the electrical apparatus.

19. The method in accordance with claim 16 further including the steps of:
   (a) scaling the second digital signal prior to subtracting it from the extant value in first store;
   (b) scaling the third digital signal prior to adding it to the extant value in the second store; and,
   (c) scaling the value representing heat lost by the core material prior to subtracting it from the extant value in the second store.

20. The method in accordance with claim 19 further including the step of comparing the value in the second store to a predetermined value representing a critical value and for providing in response to a predetermined relationship therebetween, a signal capable of initiating protective action with respect to the motor.

* * * * *